US012665821B2

(12) United States Patent
Ambhaikar et al.

(10) Patent No.: US 12,665,821 B2
(45) Date of Patent: Jun. 23, 2026

(54) SYSTEM AND METHOD TO DETERMINE CRITICALITY AND PRIORITIZE LIVE EVENTS TO IMPROVE PROACTIVE CUSTOMER SERVICE

(71) Applicant: NICE LTD., Ra'anana (IL)

(72) Inventors: Darshan Ambhaikar, Pune (IN); Rahul Vyas, Jodhpur City (IN); Salil Dhawan, Pune (IN)

(73) Assignee: NICE LTD, Ra'anana, IL (US)

( * ) Notice: Subject to any disclaimer, the term of this patent is extended or adjusted under 35 U.S.C. 154(b) by 0 days.

(21) Appl. No.: 18/338,080

(22) Filed: Jun. 20, 2023

(65) Prior Publication Data

US 2024/0430178 A1 Dec. 26, 2024

(51) Int. Cl.
| | |
|---|---|
| *H04L 41/5009* | (2022.01) |
| *G06Q 30/01* | (2023.01) |
| *H04L 41/50* | (2022.01) |
| *H04L 41/5074* | (2022.01) |

(52) U.S. Cl.
CPC ......... *H04L 41/5009* (2013.01); *G06Q 30/01* (2013.01); *H04L 41/5032* (2013.01); *H04L 41/5074* (2013.01)

(58) Field of Classification Search
CPC ......... G06Q 10/0631; G06Q 10/06311; G06Q 10/06316; G06Q 30/01; G06Q 30/15; G06Q 30/16; G06Q 30/015; G06Q 30/016; H04L 41/0609; H04L 41/0622; H04L 41/5009; H04L 41/5019; H04L 41/5032;

(Continued)

(56) References Cited

U.S. PATENT DOCUMENTS 11,178,025 B1 * 11/2021 Thornhill ............ H04L 41/5074
11,310,129 B1 * 4/2022 Szczepanik ......... H04L 41/5074
(Continued)

OTHER PUBLICATIONS

Clarin, J. A. "Priority-Based Scheduling Algorithm for Help Desk Support System." Int. J. Intell. Syst. Appl. Eng 11.4 (2023): 299-307. (Year: 2023).*

(Continued)

*Primary Examiner* — Vivek Srivastava
*Assistant Examiner* — William C Mcbeth

(57) ABSTRACT

An event prioritization system and methods are provided that are configured to dynamically prioritize incoming events reported by a plurality of event ticketing systems while the incoming events are live or ongoing. The system includes a processor and a computer readable medium operably coupled thereto, the computer readable medium comprising a plurality of instructions stored in association therewith that are accessible to, and executable by, the processor, to perform event prioritization operations which include receiving an event associated with a computing issue affecting a customer entity, extracting a plurality of event prioritization factors from event data of the event, calculating scores for the plurality of event prioritization factors, determining a customer impact score of the event based on the scores, determining a criticality of the event based on the customer impact score and a service level agreement, and prioritizing the event in an event handler queue.

20 Claims, 9 Drawing Sheets

(58) Field of Classification Search

CPC ............. H04L 41/5061; H04L 41/5064; H04L 41/5067; H04L 41/507; H04L 41/5074; H04L 41/06

See application file for complete search history.

(56) References Cited

U.S. PATENT DOCUMENTS

| | | | | |
|---|---|---|---|---|
| 2003/0154118 | A1* | 8/2003 | Druyan | G06Q 10/06311 705/7.13 |
| 2007/0219843 | A1* | 9/2007 | Keeler | G06Q 10/06311 705/7.26 |
| 2011/0238624 | A1* | 9/2011 | Kassel | G06Q 10/06 707/634 |
| 2013/0086587 | A1* | 4/2013 | Naik | G06F 11/3072 718/100 |
| 2016/0036652 | A1* | 2/2016 | Bellini, III | H04L 41/5074 709/223 |
| 2017/0063650 | A1* | 3/2017 | Chavali | H04L 41/5074 |
| 2017/0070402 | A1* | 3/2017 | Garg | H04L 41/5074 |
| 2018/0211260 | A1* | 7/2018 | Zhang | G06Q 30/016 |
| 2018/0322430 | A1* | 11/2018 | Guha | H04L 41/5074 |
| 2019/0158366 | A1* | 5/2019 | Higgins | H04L 41/5074 |
| 2020/0021503 | A1* | 1/2020 | de Lima | H04L 41/06 |
| 2020/0204681 | A1* | 6/2020 | Edwards | G06Q 30/016 |
| 2020/0258013 | A1* | 8/2020 | Monnett | H04L 41/5074 |
| 2020/0320455 | A1* | 10/2020 | Chin | G06Q 10/06311 |
| 2021/0091998 | A1* | 3/2021 | Ellis | H04L 41/0609 |
| 2021/0195443 | A1* | 6/2021 | Agarwal | H04L 41/5009 |
| 2021/0367860 | A1* | 11/2021 | Sridhar | H04L 41/5067 |
| 2021/0406041 | A1* | 12/2021 | Saraiya | G06Q 10/0635 |
| 2022/0070050 | A1* | 3/2022 | D'Ippolito | H04L 41/0609 |
| 2022/0116263 | A1* | 4/2022 | Ellis | H04L 41/0609 |
| 2022/0217550 | A1* | 7/2022 | Sakamoto | H04L 41/5067 |
| 2022/0377582 | A1* | 11/2022 | Sakamoto | H04L 41/5067 |
| 2023/0017471 | A1* | 1/2023 | Cooper | G06Q 10/0631 |
| 2023/0359925 | A1* | 11/2023 | Nowak | G06N 20/00 |
| 2024/0420093 | A1* | 12/2024 | Aghadavoodi Jolfaei | G06Q 10/06375 |

OTHER PUBLICATIONS

Mathenge, Joseph. "Impact, urgency & priority: Understanding the matrix." BMC Service Management Blog (2020). (Year: 2020).*

Diao, Yixin, et al. "Service analytics for IT service management." IBM Journal of Research and Development 60.2-3 (2016): 13-1. (Year: 2016).*

Singh, Jeevan. "Improving Customer Case Resolution Time in Telecom Vendor Technical Support Centers." (2014). (Year: 2014).*

Vajgel, Bruna, et al. "Development of Intelligent Robotic Process Automation: A Utility Case Study in Brazil." IEEE Access 9 (2021): 71222-71235. (Year: 2021).*

Assunçao, Marcos D., et al. "Scheduling with preemption for Incident Management: When interrupting tasks is not such a bad idea." Proceedings of the 2012 Winter Simulation Conference (WSC). IEEE, 2012. (Year: 2012).*

Bartolini, Claudio, and Mathias Salle. "Business driven prioritization of service incidents." International Workshop on Distributed Systems: Operations and Management. Berlin, Heidelberg: Springer Berlin Heidelberg, 2004. (Year: 2004).*

Bartolini, Claudio, and Cesare Stefanelli. "Business-driven IT management." 12th IFIP/IEEE International Symposium on Integrated Network Management (IM 2011) and Workshops. IEEE, 2011. (Year: 2011).*

* cited by examiner

300a

204 — Live Feed Event Processor

212 — Live Event Feed

310 — Updating Based on Critical Events

User 302

304 — Waiting Queue

306 — Criticality Based Call Prioritization

308 — ACD

Line 1

Line 2

Update Agent Groups

312a — Agent Group 1

312b — Specialized Agent Group 2

500a

Factors 502

| | | |
|---|---|---|
| 1 | Time Spent (SLA) | Current time – Issue submission time |
| 2 | Priority Score | Value between 1 to 5 (low to high) |
| 3 | Severity Score | Value between 1 to 5 (low to high) |
| 4 | #Customer impacted | Number of customers that are impacted, (starts with 0 to max 5-point scale) |
| 5 | Resolution Score | Ease of resolution: Trivial, Easy, Moderate, Difficult, Challenging |
| 6 | Complaint Score | Customer reported (Highest), Internal (Lowest) |
| 7 | Customer Category | Most valuable to least valuable |
| 8 | Issue Type | Security issue, data issue, compliance issue, etc. |
| 9 | Interaction Content Score | Sentiment score with satisfaction and churn probability |
| 10 | Threshold T1 (Impact) | Customer impact value between 1 to 10 (Low to High) |
| 11 | Threshold T2 (Time) | Time required to resolve/SLA value between 1 to 10 (High to Low) |
| 12 | Reevaluation Criteria | If time spent > SLA Threshold (T2) reevaluate the issue criticality |
| 13 | Customer Impact Reevaluation | If current impact rank > initial impact rank (while reporting issue) |
| 14 | Customer Impact Rank | Starts with 0 and increases proportionally with number of customer impacted |

FIG. 5A

SYSTEM AND METHOD TO DETERMINE CRITICALITY AND PRIORITIZE LIVE EVENTS TO IMPROVE PROACTIVE CUSTOMER SERVICE

COPYRIGHT NOTICE

TECHNICAL FIELD

The present disclosure relates generally to live event processing systems, such as those that may be used with reporting, monitoring, and resolving computing issues causing critical events, and more specifically to a system and method for identifying event criticality and prioritizing live events for resolution and proactive outreach.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Service providers, such as customer relationship management (CRM) systems may provide computing services and resources to customer entities and users. These customer entities may correspond to businesses, which, in turn, provide goods or services to consumers and other users. In this regard, with today's fast-paced digital world, customers and consumers expect speed and convenience when interacting with a business, as well as proactive customer service. People now expect companies to understand, anticipate, and address their needs. Thus, quickly solving problems after the customer calls a contact center is a reactive approach that may not meet some customers' needs and expectations. To increase customer satisfaction, service providers and businesses need to be proactive in how they deliver customer service.

In a CRM system that may provide communications, call centers, outreach, recommendations, and other actions with customers, proactive customer service may include anticipating customers' needs and reaching out to a customer concerning issues or problems before the customer contacts customer service. Sometimes this can be done before the customer even knows they have a question or issue if detected prior to rising to sufficient levels to require assistance and resolution. This may require a strong problem management capability, which enables contact centers to provide proactive customer service by stopping new issues before they have a chance to begin or cause significant harm or loss. As such, proactively informing customers and other business entities of ongoing computing and service issues may be an important aspect of a proactive customer experience to service providers. If customers are unaware of ongoing issues, they may become frustrated when they encounter problems. Therefore, by informing customers proactively, the customer can prepare for potential issues and avoid frustration.

In many circumstances, these customer issues may be known issues. At times, the issues may be reported internally in various ticketing systems, and therefore may be known to the customer and/or service provider when causing and impact to that customer. However, conventional and existing systems do not typically monitor and track the known issues that have been reported both internally and externally. The lack of such a system poses a challenge since implementing one would require considering several factors to effectively prioritize the most important and critical issues for customers and not raise excess alarms, ignore or deprioritize critical events, or otherwise improperly balance events or computing issues for criticality and prioritization. Thus, there is a need for a solution that integrates with multiple ticketing systems and prioritizes current and live events based on their level of criticality and impact, thereby providing this information to proactively create a customer service experience.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

FIGS. 5A-5B are simplified diagrams of factors and criticality scores used by the processor of FIG. 4 for determining and acting on event criticality according to some embodiments.

DETAILED DESCRIPTION

Figure 1:
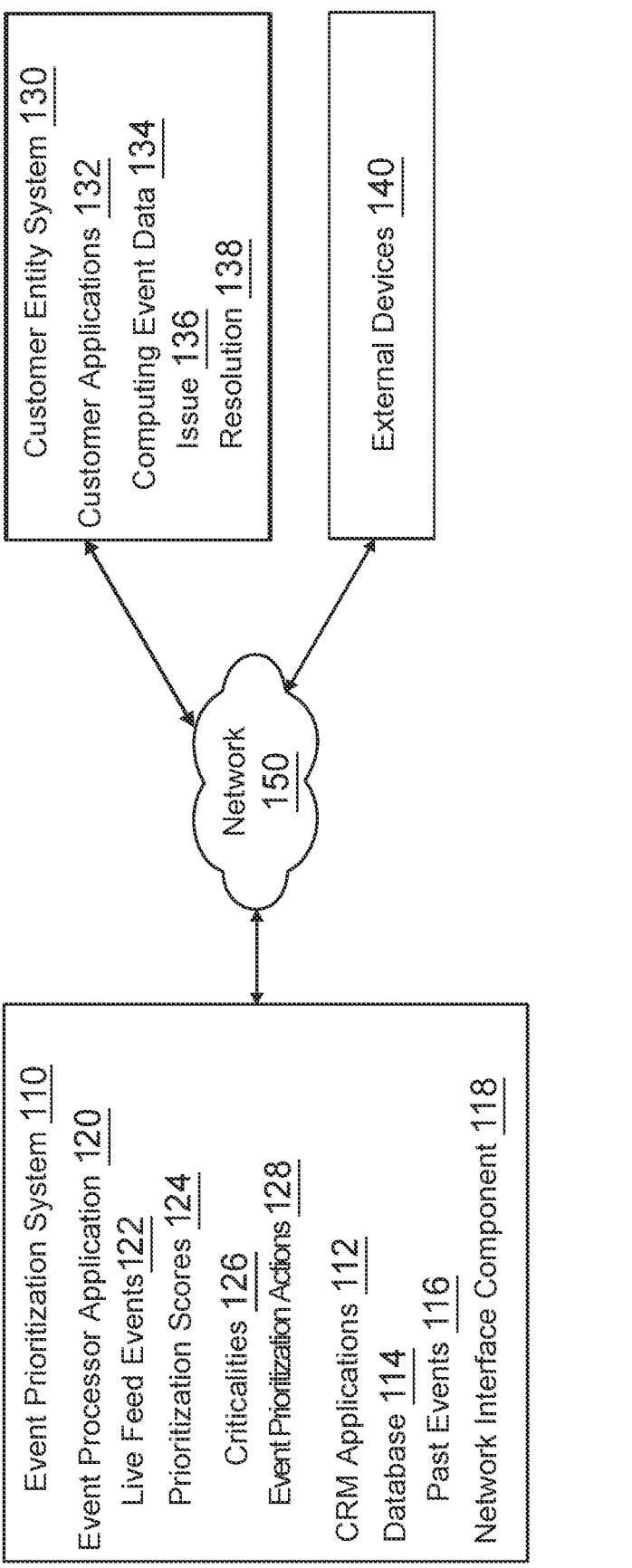
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to provide for live event feed processing for determining event criticality and prioritizing live events, a CRM system of a service provider may process live and real-time event data for proactive customer service, as discussed herein. Service level agreements (SLAs) may be designated for tenants of or entities interacting with a service provider, such as different customer end users and/or entities (e.g., businesses, companies, and other organizations). These SLAs may govern service provision and usage to those customers by the service provider, as well as provision of customer service and time to serve or assist customers with regard to that customer service and issue resolution. Additionally, the service provider may provide an automated system to capture, prioritize and utilize live and ongoing events, which may be reported and captured in various ticketing systems, and categorize the events using a live feed event prioritization module. The module and automated system may integrate and utilize CRM and ticketing systems of the service provider and/or customer business, organization, or entity, which may be provided internally by and/or externally from the service provider. For example, the service provider may have integrations with multiple different ticketing systems, which allow for capture of the details of newly created events in real-time, near real-time, and/or from an event database. This allows the automated system for event prioritization and proactive customer service to ensure critical events reach impacted customers in the minimum possible time. Thus, the system disclosed herein may advantageously enable customers to better manage their internal issues.

The live feed event prioritization module may measure and/or score data for detected and/or tracked issues for severity and criticality based on customer impact, elapsed time, and the likelihood to determine an urgency to address an issue. For example, a severity of live events may be calculated using severity scores and priority scores. This may allow the system to prioritize critical events using an algorithm that determines the criticality of the events and categorizes the events based on this criticality. The most critical events that have a highest impact, threshold impact, or maximum customer impact, or combination thereof, may be selected to be provided in a live feed of a data stream. From the stream, the live events may be consumed and evaluated to send proactive notifications to customers. Further, the system and module for live feed event prioritization allows for reevaluation of event criticality to track SLA adherence by the service provider, as well as changing customer impact of events and computing issues on computing systems and architectures.

The embodiments described herein provide methods, computer program products, and computer database systems for a CRM or customer service system that detects and processes data for live events to determine criticality of those events and corresponding computing issues affecting customers and other entities and/or their corresponding computing systems. A service provider system may therefore include a live event feed and event feed processor for tenant customers, users, and/or entities that may access different computing services of a service provider and corresponding CRM system. Once customer impact scores are determined based on event prioritization factors described herein, the live event processor may determine event criticalities using such scores and SLAs or time required to resolve. This may allow the service provider to perform corresponding prioritization, thereafter acting on those events using an event handler queue with customer service communications and outreach.

According to some embodiments, in a CRM and customer service system accessible by a plurality of separate and distinct organizations, systems, algorithms, features, and models are provided for identifying, predicting, classifying, and prioritizing live events corresponding to computing issues from data streams, real-time reports, and user interface interactions, thereby providing faster, more precise, and proactive data communications and notifications for computing issues.

Example Environment

The system and methods of the present disclosure can include, incorporate, or operate in conjunction with or in the environment of a CRM, customer service, and live event processing and reporting engine, model, and computing system, which may be utilized to determine criticality of events for computing issues and prioritize such events based on their corresponding criticality. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, machine learning (ML), neural network (NN), and other AI architectures have been developed to improve predictive analysis and classifications by systems in a manner similar to human decision-making, which increases efficiency and speed in performing predictive analysis of transaction data sets. Further, cloud-based architectures have been developed to improve collaboration, integration, and community-based cooperation between users without sacrificing data security. Such intelligent and/or cloud-based systems may be implemented and/or utilized by the computing systems and architectures discussed herein to provide live event processing and prioritization based on event criticality. One or more devices and/or servers providing and utilizing these computing services may be operated and/or maintained by the same or different entities.

FIG. 1 illustrates a block diagram of an example environment 100 according to some embodiments. Environment 100 includes an event prioritization system 110, a customer entity system 130, and external devices 140 that interact to provide event prioritization and proactive customer service based on event criticality when processing live events and event data feeds as discussed herein. In other embodiments, environment 100 may not have all of the components listed and/or may have other elements instead of, or in addition to, those listed above. In some embodiments, the environment 100 is an environment in which live event data processing and prioritization for proactive customer service may be performed through an engine, processor, and system, such as one that utilizes intelligent event data scoring based on event prioritization factors. As illustrated in FIG. 1, event prioritization system 110 might interact via a network 150 with customer entity system 130 and external devices 140, which generates, provides, and outputs event prioritizations and/or proactive customer service notifications, outreach, and other services.

System 100 of FIG. 1 includes a representation of the live feed event prioritization system and modules for live event and issue tracking, which includes prioritization based on criticality, time pending for or timeliness of resolution, and the like. In system 100, event prioritization system 110 includes an event processor application 120 configured to process live events and/or other event reports, such as those provided through live feed events 122. Live feed events 122 may include and/or consume data from live event feeds, user interfaces used to report events or computing issues causing or that may cause events, internal and/or external ticketing systems for reporting and/or cataloging events and computing issues, and the like. For example, external ticketing systems may correspond to online platforms or software applications that allow customers or users to report issues, problems, or requests for assistance. Customer entity system 130 may include customer applications 132, which may correspond to internal and/or external applications, with corresponding computing systems and support architecture, that assist a customer entity (e.g., business, organization, etc.) for their business model. External device 140 may interact with event prioritization system 110 and/or customer entity system 130 during the course of business, as well as to report events resulting from computing issues and the like. In this regard, customer applications 132 may further include external ticketing software and systems to report these events, which may correspond to computing event data 134 having an issue 136 reported. Computing event data 134 may therefore be provided to event processor application 120 for processing with live feed events 122.

The ticketing software and systems may provide a user interface (e.g., through CRM applications 112 of event prioritization system 110 and/or customer applications 132) for users to create and submit support tickets, which can then be tracked, managed, and resolved by a support team. Thus, in addition to external ticketing systems of customer applications 132, a customer user interface, such as one provided by CRM applications 112 of the service provider, may be provided where users can report new issues that were encountered. An integration module may serve as a single, central repository for data associated with the events and event criticality, which may be used to provide live feed events 122 processed by event processor application 120 for determination of prioritization scores 124 for event prioritization factors and criticalities 126. This may provide integration services that allow for the retrieval of data from external applications and ticketing systems, which allows event prioritization system 110 to obtain real-time information about newly reported issues, bugs, and events from external sources. Thereafter, based on criticalities 126, event prioritization actions 128 may be determined to prioritize, act on, and resolve events and corresponding computing issues during proactive customer outreach. Based on event prioritization actions 128, a resolution 138 may be proposed, provided, or initiated for issue 136 causing events to be reported and flagged for resolution with customer entity system 130.

Event prioritization system 110 may further include an application programming interface (API) to create a live feed of events, which may be used to pull data from CRM applications for newly reported issues and bugs. The API may include an API endpoint and perform a hypertext transfer protocol (HTTP) Method GET command to obtain context for live events and receive responses that provide details of any newly reported issue. Information received from external ticketing systems may be generic and common for most of the standard ticketing systems. The field names, if different, may be mapped to standard field types and default values may be used for fields that have not been added. Prioritization scores 124 may be determined using data for event prioritization factors, where the data may be determined from fields of event reports and other event information. Such event prioritization factors (from event fields and information in reports) may include issue submission time, issue priority, issue severity, impacted customer name, impacted customer ID, case of resolution e.g., trivial, easy, moderate, difficult, challenging, etc., complaint score (e.g., customer reported (highest), internal (lowest)), customer category (e.g., most valuable to least valuable), issue type, issue description/details, issue status, reporter information, linked to any other known or ongoing issue if any, and the like, and any combination of the foregoing. Prioritization scores 124 may be calculated based on one or more scalar functions that individually measure each of the factors from event reports. This allows for determination of customer impact scores, and, in turn, criticalities 126.

A scheduler of event processor application 120 may be used to execute live feed event processing periodically at a fixed interval of time. The time can be configurable, such as every 10 minutes, 30 minutes, hourly, or the like. A live feed events processor may be used with the aforementioned components by event prioritization system 110 to prioritize the critical real time events. The processor may include logic and algorithms to categorize the events and select the priority of events based on different criteria and data points for the event prioritization factors used to calculate prioritization scores 124. The logic and algorithms may implement the aforementioned scalar functions, which measure the individual data for the factors when determining prioritization scores 124. Further, the logic and algorithms may include one or more functions to calculate criticalities 126 based on prioritization scores 124. The processor may reevaluate events and monitor the entire lifecycle of the event from reporting to closure. Thus, the processor of event processor application 120 may also perform the operations to keep track of events using database 114 (e.g., of past events 116 that may include those previously reported and corresponding to an ongoing issue) or other databases, and thereafter push the selected events to a live critical event feed.

In some embodiments, one or more ML models, NNs, or other AI-based models and/or engines may be trained to score and calculate prioritization scores 124 and criticalities 126. For example, when training, past training data may be used, which may be associated with past events and their criticalities (e.g., affected systems and/or scope, cost due to computing issue, time to resolve, customer impact, etc.). The training data may be labeled or unlabeled for different supervised or unsupervised ML and NN training algorithms, techniques, and/or systems. Event prioritization system 110 may further use features from such data for training, where the system may perform feature engineering and/or selection of features associated with the features used for training and decision-making using one or more ML, NN, or other AI algorithms, operations, or the like (e.g., including configuring decision trees, weights, activation functions, input/hidden/output layers, and the like). After initial training, models and engines may be deployed in a production computing environment to receive inquires and data for features and predict labels or other classifiers from the data (e.g., event criticality). Features and other event data may be represented as vectors, as well as corresponding outputs for classification, ranking, and/or comparison during prioritization of events based on criticality. This may allow for representation of data as n-dimensional vectors and/or matrices, as well as calculation of such vectors or other data representations from matrices. A NN or other ML-based model may then be trained using a function and/or algorithm for the model trainer, as well as other AI systems, trainers, and operations for model and/or engine training and development. The training may include adjustment of weights, activation functions, node values, and the like.

One or more client devices and/or servers (e.g., customer entity system 130 and/or external devices 140) may execute a web-based client that accesses a web-based application provided by event prioritization system 110, or may utilize a rich client, such as a dedicated resident application, to access event prioritization system 110. Computing services of event prioritization system 110 may be provided by CRM applications 112 and/or other computing services, platforms, interfaces, and data processing operations to customer entity system 130 and/or external devices 140. External devices 140 may utilize one or more application programming interfaces (APIs) to access and interface with CRM applications 112 and/or customer applications 132 in order to engage in computing services, as discussed herein. Interfacing with event prioritization system 110 and/or customer entity system 130 may be provided through an application for CRM applications 112 and/or customer application 132 and may be based on data stored by database 114 of event prioritization system 110, provided by customer entity system 130, and/or provided by external devices 140. External devices 140 might communicate with event prioritization system 110 and/or customer entity system 130 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between event prioritization system 110, customer entity system 130, and/or external devices 140 may occur over network 150 using a network interface component of the client devices and a network interface component of event prioritization system 110. In an example where HTTP/HTTPS is used, the client devices might include an HTTP/HTTPS client commonly referred to as a "browser" for sending and receiving HTTP//HTTPS messages to and from an HTTP//HTTPS server, such as Event prioritization system 110 via the network interface component.

Event prioritization system 110 may host an online platform accessible over network 150 that communicates information to and receives information from customer entity system 130 and/or external devices 140. Such an HTTP/

HTTPS server might be implemented as the sole network interface between customer entity system 130 or external devices 140 and event prioritization system 110, but other techniques might be used as well or instead. In some implementations, the interface between customer entity system 130 or external devices 140 and event prioritization system 110 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

The devices, servers, and/or components in environment 100 may utilize network 150 to communicate, such as between with event prioritization system 110, customer entity system 130, and/or external devices 140, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. The most common type of computer network in current use is a transfer control protocol and Internet protocol (TCP/IP) network, such as the global inter-network of networks often referred to as the Internet. However, it should be understood that the networks that the present embodiments might use are not so limited, although TCP/IP is a frequently implemented protocol. Further, one or more of event prioritization system 110, customer entity system 130, and/or external devices 140 may be included by the same system, server, and/or device and therefore communicate directly or over an internal network.

According to one embodiment, event prioritization system 110 and/or customer entity system 130 is/are configured to provide webpages, forms, applications, data, and content to one or more client devices (e.g., external devices 140 or the like) and/or to receive data from the client device(s). In some embodiments, event prioritization system 110 and/or customer entity system 130 may be provided or implemented in a cloud environment, which may be accessible through one or more APIs with or without a correspond graphical user interface (GUI) output. Event prioritization system 110 and/or customer entity system 130 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, event prioritization system 110, customer entity system 130, and external devices 140, shown in FIG. 1, execute processing logic with processing components to provide data used for CRM applications 112, customer application 132, and the like and/or utilize CRM applications 112, customer application 132 and the like of event prioritization system 110. In some embodiments, this may include providing reports and other data for events that are prioritized as discussed herein, as well as engaging in customer service proactively provided based on event prioritization. In one embodiment, event prioritization system 110, customer entity system 130, and/or external devices 140 include application servers configured to implement and execute software applications, as well as provide related data, code, forms, webpages, platform components or restrictions, and other information. Event prioritization system 110 may implement various functions of processing logic and processing components, and the processing space for executing system processes, such as running applications for event prioritization. Event prioritization system 110, customer entity system 130, and external devices 140 may be accessible over network 150. Thus, event prioritization system 110 may send and receive data to one or more of customer entity system 130 and external devices 140 via network interface components. Customer entity system 130 and external devices 140 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

The system shown and described in FIG. 1 includes elements that are explained briefly here. For example, external devices 140 may include a desktop personal computer, workstation, laptop, notepad computer, PDA, cell phone, or any wireless access protocol (WAP) enabled device or any other computing device capable of interfacing directly or indirectly to the Internet or other network connection. External devices 140 may also be a server or other online processing entity that provides functionalities and processing to other client devices or programs, such as online processing entities that provide services to a plurality of disparate clients.

External devices 140 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, external devices 140 and all of the components thereof are configurable using applications, such as a browser, including computer code run using a central processing unit such as an Intel Pentium® processor or the like. However, external devices 140 may instead correspond to a server configured to communicate with one or more client programs or devices, similar to a server corresponding to event prioritization system 110 that provides one or more APIs for interaction with the client devices.

Event prioritization system 110, customer entity system 130, and/or external devices 140 (as well as any client devices) and all of their components might be operator configurable using application(s) including computer code to run using a central processing unit, which may include an Intel Pentium® processor or the like, and/or multiple processor units. A server or device for event prioritization system 110, customer entity system 130, and/or external devices 140 may correspond to Window®, Linux®, or the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring event prioritization system 110, customer entity system 130, and external devices 140 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), micro-drive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Event Prioritization Based on Event Prioritization Factors and Criticality

Figure 2:
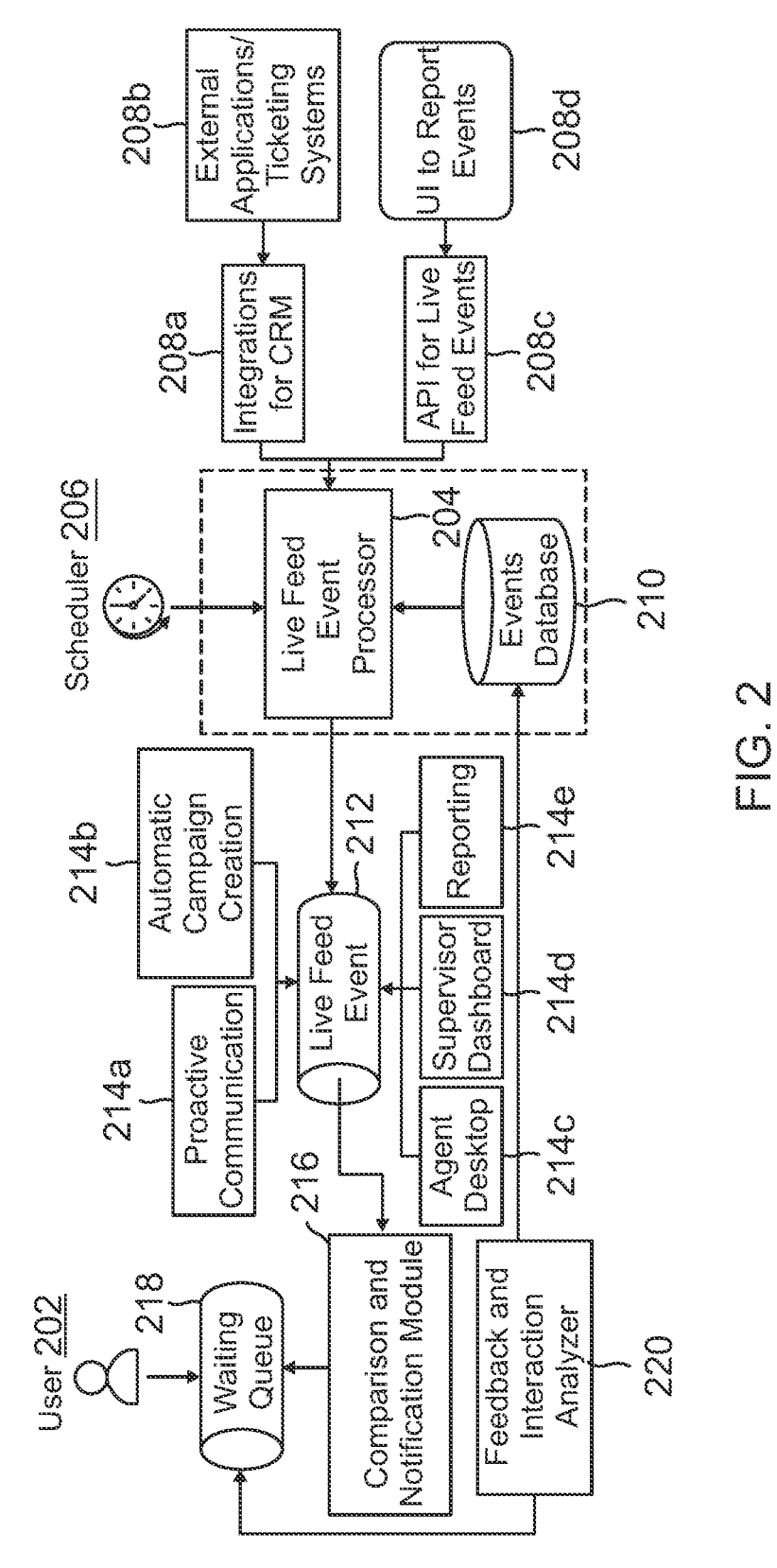
FIG. 2 is a simplified system environment for determining event criticality of live events and providing proactive customer service according to some embodiments.

FIG. 2 is a simplified system environment 200 for determining event criticality of live events and providing proactive customer service according to some embodiments. System environment 200 shows a system for processing live events in order to prioritize the live events and corresponding issues, problems, or the like causing those events, such as computing issues that may affect computing systems, software, or architecture of a customer business or organization. In this regard, system environment 200 displays components that may be used for these operations, such as those used by event processor application 120 of event prioritization system 110 from environment 100 of FIG. 1.

A client device, customer, business, organization, or the like corresponding to user 202 may utilize computing resources, applications, and solutions provided by a service provider. The service provider or another CRM provider may provide CRM systems including customer service that assists in resolving issues faced by customers with these computing solutions and services. In this regard, in system environment 200, a live feed event processor 204 is shown for a CRM and/or customer service system or computing architecture, which may be implemented and/or executed to provide proactive customer service and outreach through event prioritization based on event criticality. A scheduler 206 may be used with live feed event processor 204 to execute live feed event processing periodically at a fixed interval of time (e.g., every 10 minutes, 30 minutes, hourly, or the like). Data for live feed event processor 204 may include data from CRM integrations 208a, external applications and ticketing systems 208b, an API 208c for live feed events, and/or a user interface 208d to report events. For example, CRM integrations 208a may correspond to integration services that allow for the retrieval of data from external applications and ticketing systems 208b, which may include real-time information about newly reported computing issues, bugs, and other events from external sources. External applications and ticketing systems 208b may correspond to online platforms or software applications that allow customers or users to report issues, problems, or requests for assistance. These may provide a user interface for users to create and submit support tickets, which can then be tracked, managed, and resolved by a support team. For example, such systems may include Zendesk®, Service-Now®, Salesforce Service®, a custom-developed ticketing system, and the like.

API 208c may provide an API to pull data from CRM applications 112 for newly reported issues and bugs, which may utilize API calls to API endpoints (e.g., HTTP method, context, response, etc.) with GET commands, requests for live events, and/or requests for details of newly reported issues. UI 208d may correspond to a UI of CRM applications 112, which may allow users to report encountered issues and other events. As part of obtaining data, live feed event processor may receive generic and/or common information, where fields may have mapped data that is processable based on standard field types. Default values and data fields may include labels such as Issue submission time, Issue priority, Issue severity, Impacted customer name, Impacted customer identifier, Ease of resolution (e.g., trivial, easy, moderate, difficult, challenging, etc.), Complaint score (customer reported (highest) to internal report (lowest)), Customer category (most valuable to least valuable based on analysis or metric), Issue type, Issue description/details, Issue status, Reporter information, and/or Linked to any other known or ongoing issue, if any.

Live feed event processor 204 may include the logic and algorithm to categorize the events and select the priority of events based on different criteria and data points, as well as reevaluate events and monitor the lifecycle of the event from reporting to closure. Live feed event processor 204 may perform operations to keep track of events (e.g., using events database 210) and push selected events to live event feed 212. Events database 210 may correspond to a centralized data store for all the events generated with details of each event.

In order to provide for live event processing and criticality determination, live feed event processor 204 may execute operations to extract data for events, score such data based on factors and features for event prioritization, and determine event severity of events. In this regard, events may be categorized based on priority for different severities. Those severities include categories such as: critical—a critical issue is one that has a severe impact on the system or product, major—a major issue is one that has a significant impact on the system or product but is not as severe as a critical issue, medium—a medium issue is one that has a moderate impact on the system or product and can be resolved without causing significant disruption or downtime, or minor—a minor issue is one that has a minimal impact on the system or product and can be easily resolved without causing any disruption or downtime, other intermediate severities, or any combination of the foregoing.

A range of parameters and data points may be used to classify events and assess on a scale, such as a 5-point or other scale, using scalar functions. For example, with a 5-point scale, with a score of 1 denoting the lowest and 5 the highest, the following parameters may be utilized: Time spent, Priority score, Severity score, Number of customers impacted, Resolution score, Complaint score, Customer category, Issue type, Interaction content score, Threshold T1 for impact, Threshold T2 for time, Reevaluation criteria, Customer impact reevaluation, and/or Customer impact rank. These may correspond to event prioritization factors and features of event data used to score events for customer impact and determine a criticality of events based on that customer impact and time to resolve the underlying computing issues or the like. Event criticalities may be calculated and output by live feed event processor 204, such as to live event feed 212.

Live event feed 212 may provide a stream of real-time critical events prioritized by live feed event processor 204, which may be pushed downstream to various channels and processors for proactive customer service and outreach. For example, live event feed 212 may be used to provide proactive communication 214a to customers and other users of customers that inform such customers of computing issues affecting their systems (e.g., based on events occurring), as well as provide resolutions or assistance in fixing, remediating, or otherwise resolving the events and computing issues. An automatic campaign creation 214b may be generated to provide a customer service campaign to alert customers of known or potential computing issues and resolutions to issues or steps to avoid such issues. An agent desktop 214c may be populated with information concerning the events and computing issues from live event feed 212 based on event criticalities, which allows service agents to assist customers proactively and/or in real-time when service calls and requests come in. Similarly, a supervisor dashboard 214d may be populated with similar information for help and assistance platforms. Reporting 214e may also be performed and provided to customers to alert them of reported events and computing issues that have affected or may affect their systems. Proactive customer service, outreach, and actions to be taken based on the event prioritization factors' scores and determined criticalities, as discussed in further detail with regard to FIGS. 3A-3C below.

Live event feed 212 may push data to a comparison and notification module 216, which may compare event criticalities and establish, maintain, and organize a waiting queue 218 for an event handler or the like of events and customer issues with user 202 and/or other users and customers. Comparison and notification module 216 may compare, rank, and notify based on criticalities of events, which may be used with waiting queue 218. Waiting queue 218 may correspond to an event handler and queue for a virtual line that customers are placed in when they contact a business or CRM system, such as when agents are handling other calls or tasks. Waiting queue 218 may allow customers to hold their place in line and wait for the next available agent to become free, which may be based on event prioritization and criticality. A feedback and interaction analyzer 220 may provide analysis of such data from user 202 and/or other users or customers. For example, feedback and interaction analyzer 220 may, after sending proactive communications to customers, monitor the volume of incoming calls to assess any changes. To accomplish this, feedback and interaction analyzer 220 may track calls from customers who have received proactive communications. Tracking may occur from the time a proactive communication is sent until the event is resolved. Events database 210 may be updated with relevant information when a critical call is received from a customer who was notified earlier. Feedback and interaction analyzer 220 may create a continuous feedback loop by tracking incoming calls against proactive communications sent for live events, thereby determining a call volume that may be used to prioritize computing issues and events and increase customer impact ranks through "vertical transitioning," as further discussed below. With interaction content analysis, feedback and interaction analyzer 220 may, upon receiving customer interactions regarding a reported issue or ongoing concern, examine the call contents. This may provide real-time interaction guidance and inputs for customer call sentiment scores, behavioral scores, satisfaction scores, and/or churn probability. In this regard, the sentiment of the customer may be a critical factor in determining the urgency of an event and/or corresponding computing issue through event prioritization.

Figure 3A:
FIGS. 3A-3C are simplified system environments for different proactive customer service and outreach based on event criticality according to some embodiments.
Figures 3B, 3C:
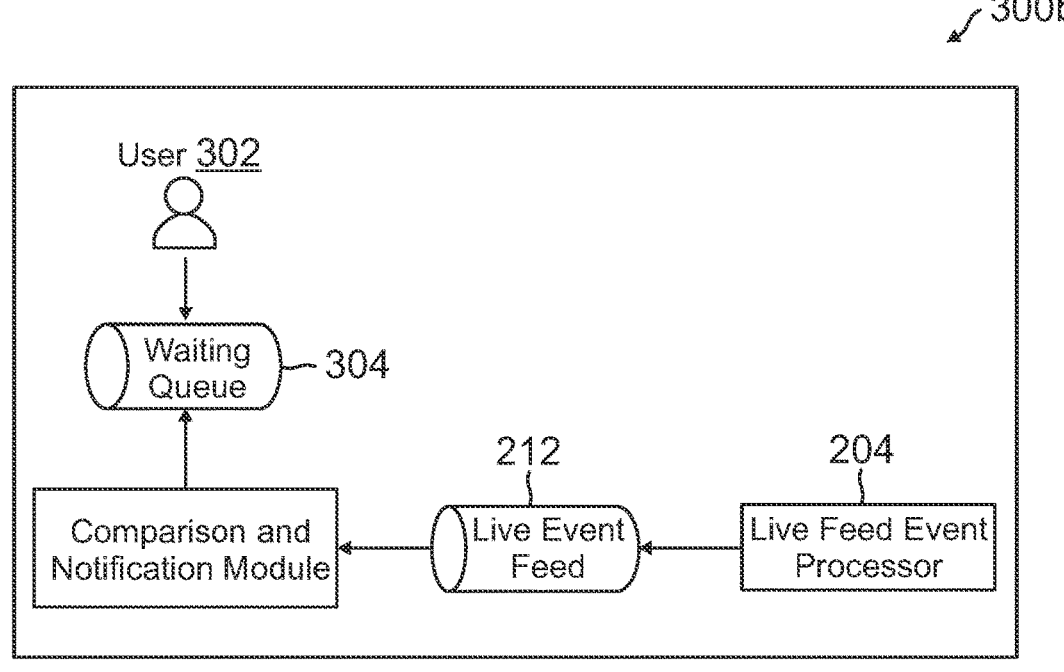

FIGS. 3A-3C are simplified system environments 300a-300c for different proactive customer service and outreach based on event criticality according to some embodiments. In this regard, system environments 300a-300c show different systems and components ingesting and acting on event prioritizations from live feed event processor 204 from system environment 200 of FIG. 2, which may correspond to those components and modules of event processor application 120 of event prioritization system 110 from environment 100 of FIG. 1. For example, system environment 300a displays a more detailed environment where customer service calls and assistance may be prioritized based on event criticality.

After event prioritization by live feed event processor 204, a user 302 in system environment 300a may receive proactive and/or prioritized customer service based on event criticality, as computed by live feed event processor 204. This may be used for scheduling and staffing in CRM systems and with live agents based on waiting queue 304, as well as automated caller-dialer (ACD) routing with call center operations. In this regard, live feed event processor 204 may provide event criticality to live event feed 212, and criticality-based call prioritization 306 may be determined and output from live event feed 212. Thus, criticality-based call prioritization 306 may affect a waiting queue 304, where calls may be routed to an ACD 308 with higher priority (e.g., based on impact score and/or reason). Accordingly, ACD 308 may ensure calls are routed to agents in a minimal possible time based on waiting queue 304 and criticality-based call prioritization 306. Alternately, a workforce management (WFM) system may ensure a contact center is adequately staffed to handle such calls with agents having appropriate skills to handle those calls prioritized by criticality-based call prioritization 306, which may provide enhanced and improved customer experience to such highly critical calls. Thus, updating 210 of agent group 1 312a and/or specialized agent group 2 312b may be performed based on criticality-based call prioritization 306 and/or other data from live event feed 212.

For criticality-based call prioritization 306, if there is a critical issue or event that requires immediate attention, calls related to that issue may be given a higher priority in the ACD system and/or waiting queue 304 for ACD 308. This may ensure that these calls are routed to agents who are best equipped to handle the situation and that they receive prompt attention. Once live feed event processor 204 prioritizes the event and adds it to live event feed 212, criticality-based call prioritization 306 may be determined and implemented for waiting queue 304.

From waiting queue 304, the CRM system and/or ADC 308 may determine the call context and provide a customized message based on event and/or computing issue information and criticality, as well as organize and/or place the call in waiting queue 304 based on criticality-based call prioritization 306. If a critical event requires specialized expertise, calls related to that event may be routed to agents who have the necessary skills and training (e.g., specialized agent group 2 312b). Further, when critical issues and events occur in a contact center, staffing needs may be reassessed to ensure that the center can continue to operate effectively and provide high-quality service to customers. Specialized agent group 2 312b consisting of agents with necessary skills and training to handle events may be created to handle critical events in addition to agent group 1 312a. This may depend on factors including volume of interactions related to ongoing live events (e.g., phone calls, emails, chats and digital channels), complexity of the issue and resolution score, total number of live events (which may increase or decrease the total number of agents needed to handle the calls related with critical events), and the like. The WFM system may determine whether to increase agents to specialized agent groups to handle the critical calls which may be prioritized and routed to the agent groups based on criticality-based call prioritization 306. If the event is resolved or there are fewer open events, the specialized group of agents can be released and/or start handling other types of calls.

In system environment 300b, components and modules are shown interacting to compare live events and issue proactive notifications. For example, comparison and notification module 216 may receive data for event prioritizations from live event feed 212, which may be based on scoring of event prioritization factors for events, and determination of criticality by live feed event processor 204 using that scoring. User 302 may interact with waiting queue 304 when contacting a call or other contact center. In this regard, call context for the call may provide relevant information about a customer and issue, which may assist an agent in understanding the situation and providing assistance. As such, comparison and notification module 216 may provide data to waiting queue 304 for call context based on event prioritizations, which may be used for proactive customer assistance by agents. During proactive customer assistance, the call center may provide an automated process to match the call context of incoming calls with ongoing real-time events. If the call context matches with the known ongoing event, then a voice prompt can be played back to user while they wait on a call. During the incoming calls from the waiting queue, the system may determine the context of the call and proactively notify the customer of ongoing live issues to avoid further escalation. Further, the proactive customer service system may send subsequent updates and notifications to customers on preferred digital channels. This may ensure the customer is provided information proactively and the customer can request subsequent automated actions including frequent status updates or automated updates for issue resolution. Further, the proactive customer service may ensure shortened queue for interactions by leveraging digital channels in the process for communications with customers.

In system environment 300c, components and modules are shown interacting to provide proactive communications to customers in a preferred digital channel used for communications with or by the customer. Live feed event processor 204 may provide determined event criticalities to live event feed 212 for use with proactive communications 214a. In this regard, a notification service 314 may correspond to a module that receives proactive communications 214*a* and is used to determine the preferred digital channel for the customer. Notification service 314 may then sent the proactive notification to the customers preferred digital channel, such as email, text message or social media, such as via a notification queue 316 to user 302. Notification queue 316 may use systems and notification services available to send the notifications. In this regard, sending proactive communication can also help to reduce customer frustration by providing timely and relevant information that may prevent the customer from having to reach out for support or clarification. Also, once the issue is resolved, notification service 314 may further provide an update to the customer to complete customer service provision.

Figure 4:
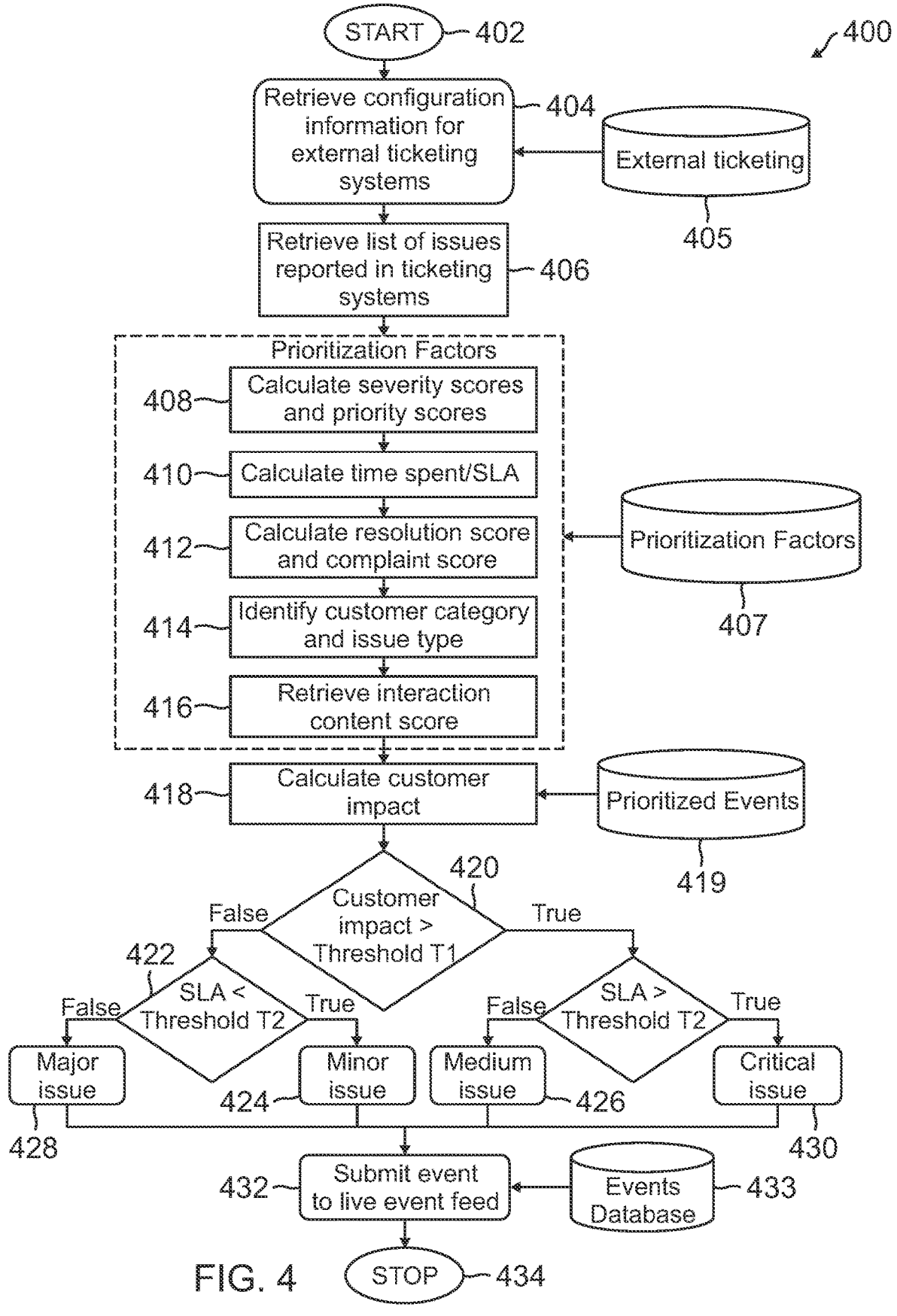
FIG. 4 is a simplified diagram of an exemplary flowchart executed by a processor for determining and acting on event criticality for live events according to some embodiments.

FIG. 4 is a simplified diagram of an exemplary flowchart 400 executed by a processor for determining and acting on event criticality for live events according to some embodiments. Note that one or more steps, processes, and methods described herein of flowchart 400 may be omitted, performed in a different sequence, or combined as desired or appropriate based on the guidance provided herein. Flowchart 4 is described below in conjunction with FIGS. 5A-5B for determination of criticality scores from event prioritization factors, as discussed herein.

Figure 5B:
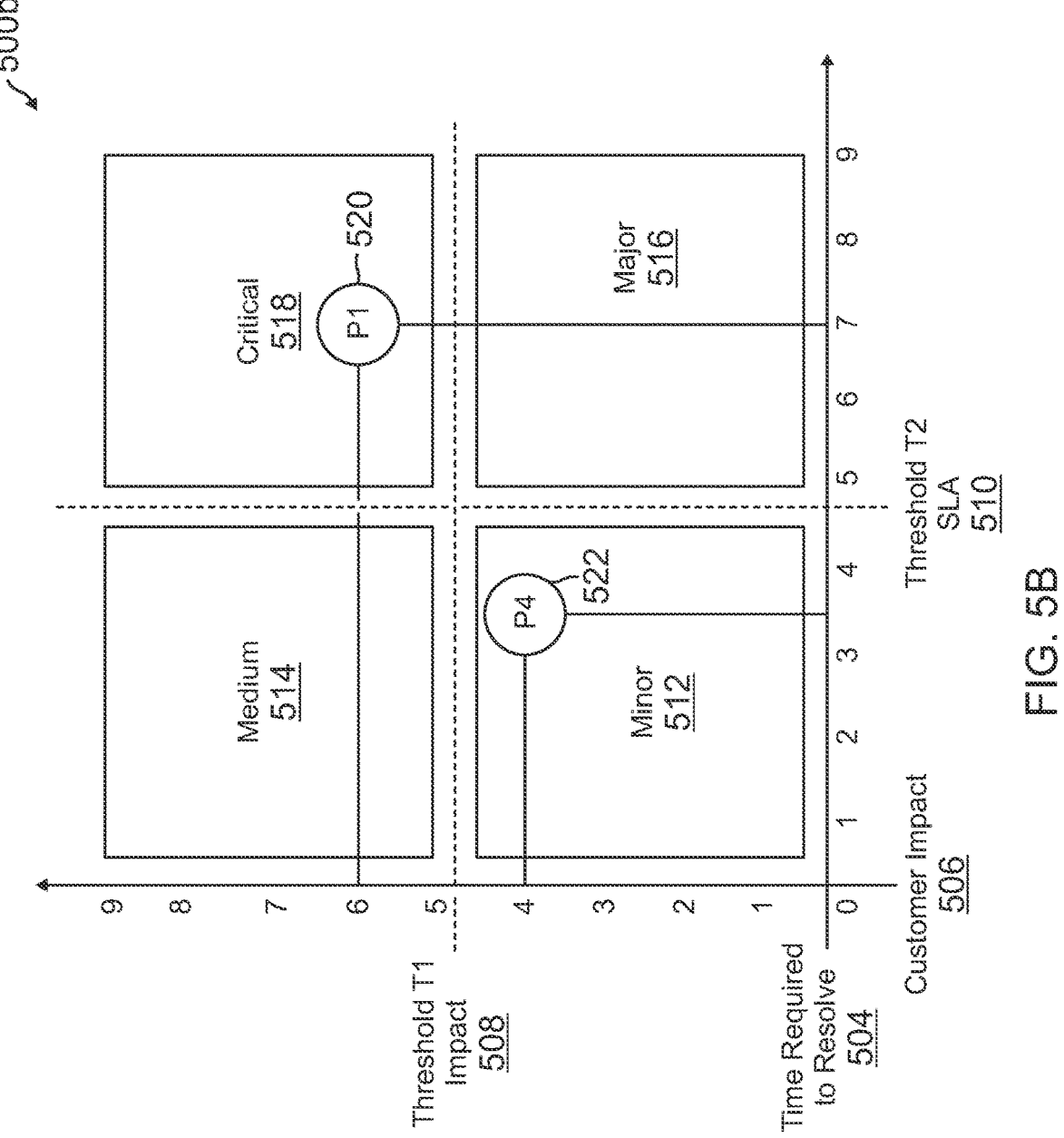

FIGS. 5A-5B are simplified diagrams 500*a*-500*b* of factors and criticality scores used by the processor of FIG. 4 for determining and acting on event criticality according to some embodiments. For example, diagram 500*a* displays factors 502 for event prioritization, which may be used in scoring event data and determining a customer impact score and event criticality. Diagram 500*b*, includes a graph plotting a time to resolve 504 with a customer impact 506 based on an impact threshold T1 508 and an SLA threshold T2 510 (e.g., a time-based threshold).

Flowchart 400 begins with step 402 where the event prioritization process starts, and event data is processed by an event feed and data processor. At step 404, configuration information for external ticketing systems is retrieved, such as from an external ticketing database 405. This allows a list of issues reported in ticketing systems to be retrieved at step 406. Using the retrieved data, step 408 initiates a series of steps where data for prioritization factors 407 is extracted and processed to determine event prioritization scores used when calculating or computing a customer impact score. The customer impact score may then be used with a time to resolve factor or score, as well as other parameters, factors, and data features, to determine an overall criticality of an event. In this regard, prioritization factors 407 for events may correspond to factors 502 from FIG. 5A. For example, step 408 includes calculating a severity score and a priority score. Step 410 includes calculating a time spent and SLA time. Step 412 includes calculating a resolution score and complaint score. Step 414 includes identifying a customer category and issue type, and step 416 includes retrieving an interaction content score. Extraction of data and determination of scores from such data for prioritization factors 407 are discussed with regard to factors 502 in diagram 500*a* of FIG. 5A.

Factors 502 in diagram 500*a* include a priority assessment, a severity assessment, a comparison of a time spent for the event to the threshold time for the SLA, a number of impacted customers, an case of resolution, a complaint source, a customer category, an issue type, an interaction content sentiment, a customer impact value, a time required to resolve the computing issue, a reevaluation of criticality criteria, a customer impact reevaluation criteria, and/or a customer impact rank. For example, a priority rating may be assigned a value between 1 and 5 for a priority of an event, where a severity score is provided an impact description and corresponding 1 to 5 score. The scores may include: 1—Trivial for little or no impact on a customer, 2—Minor for minor problems or easily worked around, 3—Major for issues that have the potential to affect progress, 4—Critical for serious problem that could block progress, and 5—Blocker for problems and issues that will block progress for the customer. A time spent or SLA may be calculated as a current time minus an issue submission time, where the current time is an epoch timestamp of the current time, and the issue submission time is the epoch timestamp when the issue was first reported. The number of customers impacted with the current issue, which may range from 0 to 5 on a 5-point scale, may correspond to information received from a ticketing system. A resolution score may be calculated on a 5-point scale for ease of resolution of an issue and may correspond to a technique used to measure how easy or difficult it is to resolve a particular issue or problem. The scale may range from 1 to 5, with 1 being the easiest and 5 being the most difficult.

A complaint score may be a metric to determine the dissatisfaction level depending on how and where the issue was reported. For any customer reported issues, the complaint score will be highest, and for internally reported issues, the complaint score will be lowest, for example, using a computation for a 1-to-5-point scaler function. For a customer category score, customers may be categorized based on value to the business. The most valued customers may have a highest score compared to least valued customers. The score for a customer value may also depend on various packages that customers opt for with the service provider and based on purchased and/or selected CRM systems and services (e.g., premium, normal, etc., which may be given a value between 1 and 5). For issue type, there may be various types of issues reported in the ticketing systems, where certain issue types have more importance over others. For example, security issues, data issues, compliance issues, technical issues, service issues, etc., may each have a corresponding importance and/or urgency to address, and therefore prioritization when provided a value or score using a 1-to-5-point scalar function.

With an interaction content score and/or sentiment score, a customer's interaction and sentiment during the event and/or when reporting the event or computing issue may be assessed. The sentiment or interaction score may be obtained by analyzing the content of customer interactions and may utilized as feedback for the event prioritization module. The sentiment expressed by customers reporting an issue may be crucial in determining the criticality of an event. The score may be applicable for customers reporting an issue via the contact center or for those inquiring about an existing ongoing real-time event. A first T1 threshold for customer impact (threshold T1 impact) may be determined for a customer impact value, such as between 1 to 10 or other scale based on the corresponding function for score calculation. To determine criticality and prioritize the live events, determining customer impact may be the most important factor. Once the customer impact is determined, a threshold for the impact may be set by providing the values between 1 to 10 on a 10-point scale, where the higher the value, the higher the threshold for assigning criticality and prioritizing events. This may mean fewer events are eligible for prioritization. A lower threshold indicates more events may be eligible for prioritization. For a threshold T2 for time, the threshold may correspond to a time required to resolve an issue and/or SLA. For example, companies may be bound by an SLA where they are required to maintain certain levels of uptime. Any issues that occur may have certain SLA requirements, and the customer may set the threshold for SLA to control and manage the criticality of live event prioritization on a 10-point scale.

Reevaluation criteria for horizontal transitioning of events may also be included in factors 502, where a live feed event prioritization module may periodically execute and determine the criticality of and event or computing issue. In subsequent executions, the module may reevaluate the criticality to check for any changes. The reevaluation criteria may consider elapsed time and the SLA threshold (T2). In this regard, over a time period, an event may transition from minor to major or from medium to critical, with "horizontal transitioning" of the issue based on a reevaluation of time spent versus the SLA threshold (T2). This may be done if the time spent meets or exceeds T2 for the SLA threshold.

An event impact rank may be a metric to measure the total number of customers who are suffering from the same or similar issue. Calculation of an event impact rank may be performed using the following from Equation 1:

$$\text{Event impact rank} = \qquad \text{Equation 1}$$
$$\frac{\text{Total number of impacted customers}}{\text{Threshold for customer numbers}} * \text{Scaling factor}$$

The impact rank starts with 0 and proportionally increases as more and more customers become affected with the same or similar issue. The threshold for the customer impact (T1) can be set for a maximum number of acceptable ranges for a number of customers impacted. In this regard, for reevaluation criteria to perform "vertical transitioning" of an event and/or computing issue, affected customers may be analyzed and compared to T1 for the threshold for customer impact. The live feed event prioritization module may check the impact rank of the issue and, if it increases over the period of time, vertical transition the event and/or computing issue between criticalities. Vertical transitioning may include transitioning from minor to medium or major to critical if similar issues are reported and if the impact rank is increased. Once the vertical transitioning is done, or once a proactive notification is sent, the impact rank may be set back to zero. Thus, reevaluation may occur if the impact rank meets or exceeds the initial event impact rank while reporting an issue.

For factors 502, calculating the customer impact may be performed at step 418. The customer impact may also be affected by data from a database of prioritized events, such as past, current, and/or ongoing events and their corresponding criticalities for prioritization. Criticality of an issue may depend on the customer impact of the issue, and thus, based on all the event prioritization factors in factors 502, the system may calculate the final customer impact for the given issue and/or event(s). Calculation of customer impact may be performed using the following from Equation 2:

$$\text{Customer Impact} = \qquad \text{Equation 2}$$
$$\frac{\sum_{i=0}^{N}(\text{Event Prioritization factors})i - 1}{N * W - 1} * \text{Scaling factor} + 1$$

Where:

$N$ = total factors

-continued
$W$ = weighting factor on scaling (e.g., 1 to 5)

Scaling factor = a number used to generate the customer impact score (e.g., a 10-point scale)

At step 420, the system and live feed event processor may then determine issue criticality by first determining the customer impact score using event prioritization factors or other parameters, such as those from factors 502 as discussed above. The number may be converted using a scalar function to a point scale, such as a 10-point scale. The customer impact score and the SLA (or time required to resolve) may then be used to determine issue criticality. Calculation of criticality for an event and/or corresponding computing issue may be performed using the following from Equations 3:

$$\text{Equation 3}$$
$$\text{Issue Criticality} =$$

$$\sum_{i=0}^{N}\Big((\text{Customer Impact } (i) > \text{Threshold } T1(i)) \rightarrow$$

$$\left\{ \begin{array}{ll} SLA(i) > \text{Threshold } T2(i) & \text{CRITICAL ISSUE} \\ SLA(i) < \text{Threshold T2}(i) & \text{MEDIUM ISSUE} \end{array} \right\}$$

Where $n$ is the number of issues $$\Big((\text{Customer Impact } (i) < \text{Threshold } T1(i)) \rightarrow$$

$$\left\{ \begin{array}{ll} SLA(i) < \text{Threshold } T2(i) & \text{MINOR ISSUE} \\ SLA(i) > \text{Threshold T2}(i) & \text{MAJOR ISSUE} \end{array} \right\}$$

For example, at step 420, the customer impact score is compared to the threshold T1 for customer impact. Based on the comparison, flowchart 400 may proceed to step 422a or step 422b based on whether the score meets or exceeds, or fails to meet or exceed such threshold. Based on meeting, failing to meet, or exceeding the threshold T1 for customer impact, flowchart 400 proceeds to steps 422a and 422b, where at steps 422a and 422b, the event is compared to threshold T2 for SLA or time to resolve. For example, if failing to meet or exceed the T1 impact threshold and the SLA or time to resolve is at or below the T2 time threshold, flowchart 400 proceeds to step 424 and classifies the event as a minor issue. If meeting or exceeding the T1 impact threshold and the SLA or time to resolve is at or below the T2 time threshold, flowchart 400 proceeds to step 424 and classifies the event as a medium issue. If failing to meet or exceed the T1 impact threshold and the SLA or time to resolve meets or exceeds the T2 time threshold, flowchart 400 proceeds to step 428 and classifies the event as a major issue. And if meeting or exceeding the T1 impact threshold and the SLA or time to resolve meets or exceeds the T2 time threshold, flowchart 400 proceeds to step 430 and classifies the event as a critical issue. Once categorized based on criticality, at step 432, the event is submitted to a live event feed, which may include being submitted with additional information for past and/or ongoing events from an events database 433. Flowchart 400 then ends at step 434 after categorization based on criticality.

With regard to steps 424-430, diagram 500b of FIG. 5B shows a graph of the customer impact score and SLA or time to resolve plotted against each other to generate quadrants that identify different event criticalities and classifications. In this regard, a time required to resolve 504 is shown on the X-axis and a customer impact 506 on the Y-axis in the graph. Threshold T1 impact 508 is shown as a horizontal line and threshold T2 SLA 510 (e.g., for time to resolve) is shown as a vertical line. The quadrants in diagram 500*b* may then be split into minor 512 where the event is at or below both thresholds, medium 514 where the event meets or exceeds threshold T1 impact 508 but not threshold T2 SLA 510, major 516 where the event is at or below threshold T1 impact 508 but meets or exceeds threshold T2 SLA 510, and critical 518 where the event meets or exceeds both threshold T1 impact 508 and threshold T2 SLA 510. Further shown in diagram 500*b* are two events, an event P1 520 and an event P4 522. During event P1 520, the customer impact score and time required to resolve were found to meet or exceed both threshold T1 impact 508 and threshold T2 SLA 510, and thus event P1 520 is classified as critical 518. However, with event P4 522, the corresponding customer impact score and time required to resolve were found to be at or lower than both threshold T1 impact 508 and threshold T2 SLA 510, and thus event P4 522 is classified as minor 512. During further processing, both events may horizontally or vertically transition, such as by moving between minor 512, medium 514, major 516, and/or critical 518 based on recalculated scores and SLAs/times to resolve when compared to threshold T1 impact 508 and threshold T2 SLA 510, respectively.

Figure 6:
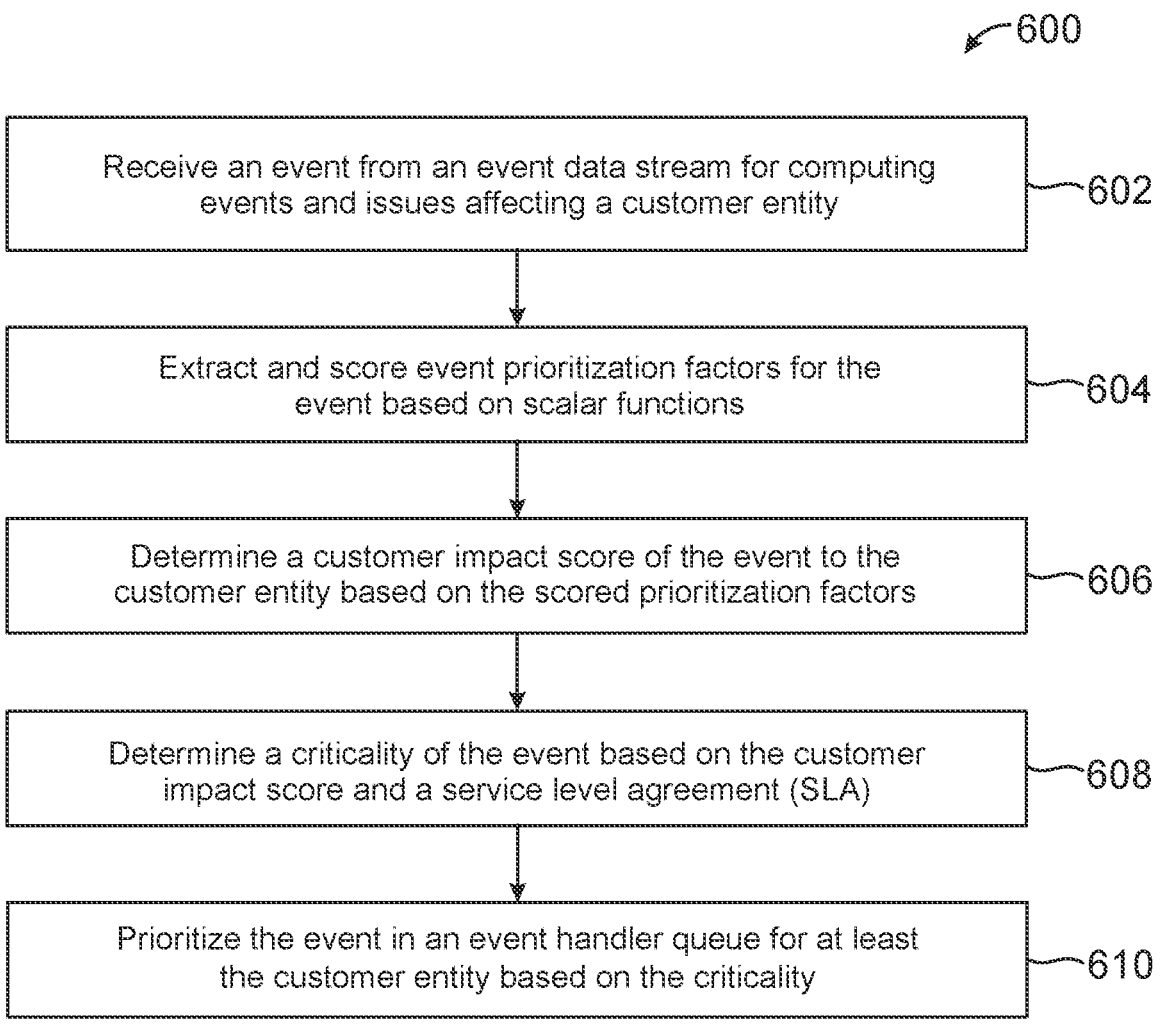
FIG. 6 is a simplified diagram of an exemplary flowchart for event prioritization of live events based on event criticality, which may be used for proactive customer service according to some embodiments.

FIG. 6 is a simplified diagram of an exemplary flowchart 600 for event prioritization of live events based on event criticality, which may be used for proactive customer service according to some embodiments. Note that one or more steps, processes, and methods described herein of flowchart 600 may be omitted, performed in a different sequence, or combined as desired or appropriate based on the guidance provided herein. Flowchart 600 of FIG. 6 includes operations for an event processing system that prioritizes events based on event criticality, as discussed in reference to FIG. 1-5B. One or more of steps 602-610 of flowchart 600 may be implemented, at least in part, in the form of executable code stored on non-transitory, tangible, machine-readable media that when run by one or more processors may cause the one or more processors to perform one or more of steps 602-610. In some embodiments, flowchart 600 can be performed by one or more computing devices discussed in environment 100 of FIG. 1.

At step 602 of flowchart 600, an event from an event data stream for computing events and issues affecting a customer entity is received. An event may correspond to a report, activity, data processing request and/or action that is detected and may be associated with a computing issue that affects the computing systems of a customer entity or end user. For example, an event may correspond to a call to a call center for assistance or the like with an underlying computing issue. In this regard, the events may be captured in event data streams for user interfaces that customers may utilize to report issues, internal or external ticketing systems, call centers and CRM services, and the like.

At step 604, event prioritization factors for the event are extracted and scored based on scaler functions. The event prioritization factor may correspond to event data that is associated with a priority, severity, or overall criticality to resolve, which may be used provide assistance for one or more events based on a computing issue affecting a customer. The event prioritization factors may be established, and scalar functions set, for scoring corresponding data that may be extracted from event reports, live event feed data, and the like for the event. A processor for a live event data stream or feed may perform the data extraction and then score the data based on the scalar functions.

At step 606, a customer impact score of an impact caused by the event to the customer entity is determined based on the scored prioritization factors. The customer impact score may be calculated using a function or algorithm that utilizes the individual scores from the event prioritization factors to determine an impact that an event and/or corresponding computing issue affecting a customer has on that customer. The customer impact score may further use a scaling factor during calculation based on the number of scored prioritization factors.

At step 608, a criticality of the event is determined based on the customer impact score and an SLA. The criticality of the event may be calculated using the customer impact score with an SLA and/or a predicted time to resolve the computing issue causing the event. For example, in a graph-based calculation, different quadrants of a chart may be used to identify different criticalities (e.g., minor, medium, major, and critical) of events, where two thresholds, one vertically and one horizontally, may be used to separate the quadrants and therefore the severities. The thresholds may correspond to threshold scores for the customer impact (a horizontal threshold) and a time for a time to resolve or SLA (a vertical threshold). Such thresholds may be used for horizontal and vertical transitioning based on updated event data.

At step 610, the event is prioritized in an event handler queue for at least the customer entity based on the criticality. The event handler queue may correspond to a waiting, messaging, and/or outreach queue, which may be used to prioritize and transmit messages and other data to customers for events and computing issues. As such, customers may receive proactive and faster customer service assistance and priority in queues based on event criticality.

As discussed above and further emphasized here, FIGS. 1, 2, 3A, 3B, 3C, 4, 5A, 5B, and 6 are merely examples of event prioritization system 110 and corresponding methods for event prioritization and proactive customer outreach, which examples should not be used to unduly limit the scope of the claims. One of ordinary skill in the art would recognize many variations, alternatives, and modifications.

Figure 7:
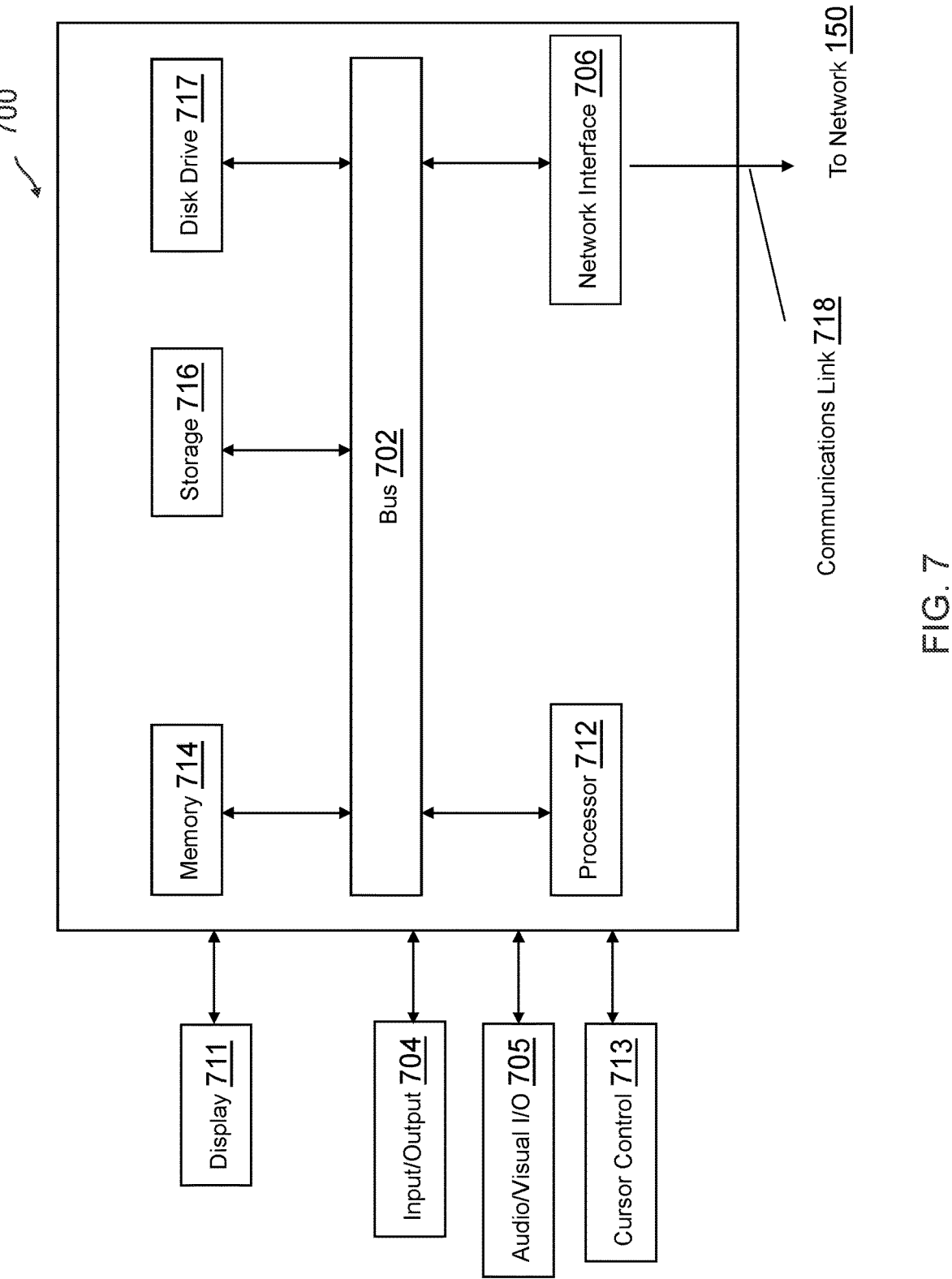
FIG. 7 is a simplified diagram of a computing device according to some embodiments.

FIG. 7 is a block diagram of a computer system 700 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio/visual input/output component 705 may also be included to allow a user to use voice for inputting information by converting audio signals. Audio/visual I/O component 705 may allow the user to hear audio, and well as input and/or output video. A transceiver or network interface 706 transmits and receives signals between computer system 700 and other devices, such as another communication device, service device, or a service provider server via network 150. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. An event prioritization system configured to dynamically prioritize incoming events reported by a plurality of event ticketing systems while the incoming events are live or ongoing, the event prioritization system comprising:

a processor and a computer readable medium operably coupled thereto, the computer readable medium comprising a plurality of instructions stored in association therewith that are accessible to, and executable by, the processor, to perform event prioritization operations which comprise:

receiving an event from an event data stream of the incoming events associated with at least one of the plurality of event ticketing systems or a user interface of a customer relationship management (CRM) system, wherein the event is associated with a computing issue affecting a computing service provided to a customer entity associated with the event prioritization system;

extracting a plurality of event prioritization factors from event data of the event, wherein the plurality of event prioritization factors are associated with at least a severity and a priority of the computing issue affecting the computing service provided to the customer entity during the event;

calculating scores for the plurality of event prioritization factors based on scalar functions that individually measure each of the plurality of event prioritization factors;

calculating a customer impact score of the event based on the scores;

determining a service level agreement (SLA) associated with the computing service provided to the customer entity;

calculating a time elapsed since the computing issue was first reported;

determining, using a task management graph comprising an impact threshold and a time threshold based on the SLA associated with the computing service, a criticality of the event based on the customer impact score and the time elapsed since the computing issue was first reported;

prioritizing the event in an event handler queue in accordance with the criticality;

transmitting a proactive notification indicating the event to each of a plurality of customer entities via a preferred communication channel;

tracking incoming calls from the plurality of customer entities that are associated with the proactive notification;

determining that at least a subset of the incoming calls is associated with the event;

recalculating the customer impact score based on call data for the at least the subset of the incoming calls;

reprioritizing the event in the event handler queue based on a change to the criticality from the recalculating the customer impact score;

routing incoming calls to customer service agents based on the reprioritizing.

2. The event prioritization system of claim 1, wherein the event prioritization operations further comprise:

executing one or more remedial actions with the customer entity for the event based on the computing issue and the event handler queue, wherein the one or more remedial actions include categorizing the event in the event handler queue, monitoring for a resolution of the computing issue causing the event, or a combination thereof;

executing one or more remedial actions with the customer entity for the event based on the computing issue and the event handler queue, wherein the one or more remedial actions include categorizing the event in the event handler queue, monitoring for a resolution of the computing issue causing the event, or a combination thereof.

3. The event prioritization system of claim 1, wherein the plurality of event prioritization factors comprise at least one of a priority assessment for the priority, a severity assessment for the severity, a comparison of the time elapsed and the time threshold based on the SLA, a number of impacted customers, an ease of resolution, a complaint source, a customer category, an issue type, an interaction content sentiment, a customer impact value, a time required to resolve the computing issue a reevaluation of criticality criteria, a customer impact reevaluation criteria, or a customer impact rank.

4. The event prioritization system of claim 1, wherein determining a criticality of the event using the task management graph comprises:

generating the task management graph, wherein the task management graph comprises four quadrants associated with different criticalities for classifying events, wherein the four quadrants are defined by a vertical line corresponding to the time threshold and a horizontal line corresponding to the impact threshold, wherein the four quadrants comprise a minor issue quadrant, a medium issue quadrant, a major issue quadrant, and a critical issue quadrant, and wherein elapsed time is shown along the x-axis of the graph and customer impact is shown along the y-axis of the graph;

plotting the event within a respective quadrant of the task management graph based on the customer impact score and the time elapsed; and assigning the criticality associated with the respective quadrant to the event.

5. The event prioritization system of claim 4, wherein the impact threshold and the time threshold are dynamic and adjustable, wherein an adjustment of at least one of the impact threshold and the time threshold shrinks or expands each of the four quadrants, and wherein the adjustment is used by at least the customer entity to control a processing flow of the incoming events in the event handler queue.

6. The event prioritization system of claim 5, wherein the event prioritization operations further comprise:

receiving an update to the event or the computing issue from the at least one of the plurality of event ticketing systems or the user interface of the CRM system; and transitioning the event between two of the four quadrants of the task management graph based on the update.

7. The event prioritization system of claim 6, wherein transitioning the event between two of the four quadrants of the task management graph comprises one of a horizontal transition and a vertical transition, wherein the horizontal transition is associated with a first change, over a time period, to the time elapsed, and wherein the vertical transition is associated with a second change of at least one of a number of additional events reported that are associated with the event or an updated customer impact rank at a current time.

8. The event prioritization system of claim 1, wherein the event prioritization operations further comprise:

performing an interaction content analysis based on at least one of a speech sentiment or a text sentiment associated with a report corresponding to the event, wherein the interaction content analysis comprises at least one of a sentiment score, a behavior score, a satisfaction score or a churn probability associated with the report, wherein the plurality of event prioritization factors include the interaction content analysis.

9. The event prioritization system of claim 1, wherein the time elapsed is calculated by subtracting a time the issue was first reported from a current time.

10. A method to dynamically prioritize incoming events reported by a plurality of event ticketing systems while the incoming events are live or ongoing by an event prioritization system, which method comprises:

receiving an event from an event data stream of the incoming events associated with at least one of the plurality of event ticketing systems or a user interface of a customer relationship management (CRM) system, wherein the event is associated with a computing issue affecting a computing service provided to a customer entity associated with the event prioritization system;

extracting a plurality of event prioritization factors from event data of the event, wherein the plurality of event prioritization factors are associated with at least a severity and a priority of the computing issue affecting the computing service provided to the customer entity during the event;

calculating scores for the plurality of event prioritization factors based on scalar functions that individually measure each of the plurality of event prioritization factors;

calculating a customer impact score of the event based on the scores;

determining a service level agreement (SLA) associated with the computing service provided to the customer entity;

calculating a time elapsed since the computing issue was first reported;

determining, using a task management graph comprising an impact threshold and a time threshold based on the SLA associated with the computing service, a criticality of the event based on the customer impact score and the time elapsed since the computing issue was first reported;

prioritizing the event in an event handler queue in accordance with the criticality;

transmitting a proactive notification indicating the event to each of a plurality of customer entities via a preferred communication channel;

tracking incoming calls from the plurality of customer entities that are associated with the proactive notification;

determining that at least a subset of the incoming calls is associated with the event;

recalculating the customer impact score based on call data for the at least the subset of the incoming calls;

reprioritizing the event in the event handler queue based on a change to the criticality from the recalculating the customer impact score;

routing incoming calls to customer service agents based on the reprioritizing.

11. The method of claim 10, further comprising:

executing one or more remedial actions with the customer entity for the event based on the computing issue and the event handler queue, wherein the one or more remedial actions include categorizing the event in the event handler queue, monitoring for a resolution of the computing issue causing the event, or a combination thereof.

12. The method of claim 10, wherein the plurality of event prioritization factors comprise at least one of a priority assessment for the priority, a severity assessment for the severity, a comparison of the time elapsed and the time threshold based on the SLA, a number of impacted customers, an ease of resolution, a complaint source, a customer category, an issue type, an interaction content sentiment, a customer impact value, a time required to resolve the computing issue, a reevaluation of criticality criteria, a customer impact reevaluation criteria, or a customer impact rank.

13. The method of claim 10, wherein determining a criticality of the event using the task management graph comprises:

generating the task management graph, wherein the task management graph comprises four quadrants associated with different criticalities for classifying events, wherein the four quadrants are defined by a vertical line corresponding to the time threshold and a horizontal line corresponding to the impact threshold, wherein the four quadrants comprise a minor issue quadrant, a medium issue quadrant, a major issue quadrant, and a critical issue quadrant, and wherein elapsed time is shown along the x-axis of the graph and customer impact is shown along the y-axis of the graph;

plotting the event within a respective quadrant of the task management graph based on the customer impact score and the time elapsed; and assigning the criticality associated with the respective quadrant to the event.

14. The method of claim 13, wherein the impact threshold and the time threshold are dynamic and adjustable, wherein an adjustment of at least one of the impact threshold and the time threshold shrinks or expands each of the four quadrants, and wherein the adjustment is used by at least the customer entity to control a processing flow of the incoming events in the event handler queue.

15. The method of claim 14, further comprising:

receiving an update to the event or the computing issue from the at least one of the plurality of event ticketing systems or the user interface of the CRM system; and transitioning the event between two of the four quadrants of the task management graph based on the update.

16. The method of claim 15, wherein transitioning the event between two of the four quadrants of the task management graph comprises one of a horizontal transition and a vertical transition, wherein the horizontal transition is associated with a first change, over a time period, to the time elapsed, and wherein the vertical transition is associated with a second change of at least one of a number of additional events reported that are associated with the event or an updated customer impact rank at a current time.

17. The method of claim 10, further comprising:

performing an interaction content analysis based on at least one of a speech sentiment or a text sentiment associated with a report corresponding to the event, wherein the interaction content analysis comprises at least one of a sentiment score, a behavior score, a satisfaction score or a churn probability associated with the report, wherein the plurality of event prioritization factors include the interaction content analysis.

18. The method of claim 10, wherein, the time elapsed is calculated by subtracting a time the issue was first reported from a current time.

19. A non-transitory computer-readable medium having stored thereon computer-readable instructions executable to dynamically prioritize incoming events reported by a plurality of event ticketing systems while the incoming events are live or ongoing using an event prioritization system, the computer-readable instructions executable to perform event prioritization operations which comprises:

receiving an event from an event data stream of the incoming events associated with at least one of the plurality of event ticketing systems or a user interface of a customer relationship management (CRM) system, wherein the event is associated with a computing issue affecting a computing service provided to a customer entity associated with the event prioritization system;

extracting a plurality of event prioritization factors from event data of the event, wherein the plurality of event prioritization factors are associated with at least a severity and a priority of the computing issue affecting the computing service provided to the customer entity during the event;

calculating scores for the plurality of event prioritization factors based on scalar functions that individually measure each of the plurality of event prioritization factors;

calculating a customer impact score of the event based on the scores;

determining a service level agreement (SLA) associated with the computing service provided to the customer entity;

calculating a time elapsed since the computing issue was first reported;

determining, using a task management graph comprising an impact threshold and a time threshold based on the SLA associated with the computing service, a criticality of the event based on the customer impact score and the time elapsed since the computing issue was first reported;

prioritizing the event in an event handler queue for the customer entity in accordance with the criticality;

transmitting a proactive notification indicating the event to each of a plurality of customer entities via a preferred communication channel;

tracking incoming calls from the plurality of customer entities that are associated with the proactive notification;

determining that at least a subset of the incoming calls is associated with the event;

recalculating the customer impact score based on call data for the at least the subset of the incoming calls;

reprioritizing the event in the event handler queue based on a change to the criticality from the recalculating the customer impact score;

routing incoming calls to customer service agents based on the reprioritizing.

20. The non-transitory computer-readable medium of claim 19, wherein the event prioritization operations further comprise:

executing one or more remedial actions with the customer entity for the event based on the computing issue and the event handler queue, wherein the one or more remedial actions include categorizing the event in the event handler queue, monitoring for a resolution of the computing issue causing the event, or a combination thereof.

* * * * *